United States Patent Office 2,891,985
Patented June 23, 1959

2,891,985

MONOMERS FOR FLAME RESISTANT RESINOUS COPOLYMERS

Everett C. Hurdis, Clifton, John F. Petras, Glen Rock, and Hendrik Romeyn, Jr., Montclair, N.J., assignors to United States Rubber Company, New York, N.Y., a corporation of New Jersey No Drawing. Application November 16, 1956
Serial No. 622,519

2 Claims. (Cl. 260—461)

This invention relates to novel symmetrical mixed neutral esters represented by the general formula

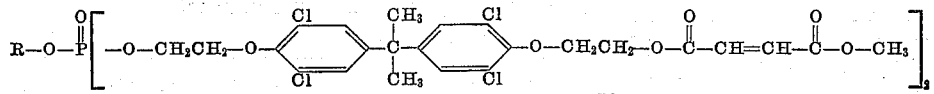

where R is an alkyl group containing from 1 to 4 carbon atoms.

These esters, like the unsaturated polyesters described in the Carleton Ellis U.S. Patent No. 2,195,362, dated March 26, 1940, and U.S. Patent No. 2,255,313, dated September 9, 1941, can be copolymerized in combination with various reactive (copolymerizable) ethylenic monomers, such as vinyltoluene, vinyl acetate, 2-methyl-5-vinylpyridine, methyl methacrylate, diallyl phthalate, triallyl cyanurate, N-vinylphthalimide, diallyl benzenephosphonate, etc., to provide new and useful plastics. However, in contradistinction to the conventional unsaturated polyesters covered by the above mentioned Ellis patents, the new monomers of this invention have the important advantage of forming copolymers with a high degree of flame resistance. Flame resistance in the liquid copolymerizable mixtures used for casting and laminating applications is a property much desired by the trade.

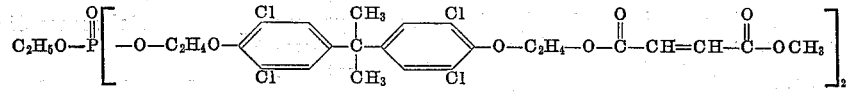

The special advantage of the new copolymerizable monomers of this invention lies in the fact that their intrinsic flame resistance is so high that copolymers containing as much as 40% of an inflammable monomer, e.g., styrene, will still be self-extinguishing.

A further specific advantage of the new monomers of this invention is their good resistance to discoloration on long exposure to light. Flame resistant copolymerizable mixtures based on polyesters containing either tetrachlorophthalic acid or hexachloro-endomethylene-tetrahydrophthalic acid are available. However, these mixtures when polymerized have poor resistance to discoloration on light aging, while the copolymerizable monomers of this invention give copolymers of superior light aging resistance.

As regards this invention, the advantages of flame resistance and light aging resistance are achieved without sacrificing other physical properties as compared to general purpose polymerizable polyester-styrene mixtures.

The following example is given to illustrate preparation and use of the esters, parts being by weight:

EXAMPLE 1

A reactor equipped with dropping funnel, gas inlet tube, mechanical stirrer, short fractionating column, and distillation head was charged with 454 g. (1 mol) of 2,2'-[isopropylidenebis(2,6-dichloro - p - phenyleneoxy)]-1-diethanol and 250 ml. of toluene. The mixture was first refluxed at pot temperature, 120° C.–130° C., the small amount of water in the system being removed azeotropically. The pot temperature was then lowered by adding 500 ml. of toluene and 250 ml. of benzene. Ethyl phosphorodichloridate, 81.5 g. (½ mol), was then added through the dropping funnel while nitrogen was bubbled in. Hydrogen chloride was evolved at a moderate rate and was disposed of through a simple scrubber. The solvent was then gradually distilled off, while a slow stream of nitrogen was bubbled through the mixture, over the course of three hours, the pot temperature rising to 115° C. Additional solvent was then slowly distilled off until the pot temperature reached 145° C. and hydrogen chloride evolution had ceased. Total reaction time for this phase of the preparation was 7 hours.

The reaction mixture was again diluted by adding 450 ml. of toluene; then 148.5 g. (1 mol) of trans-beta-(methoxycarbonyl)acrylyl chloride was added while the mixture refluxed actively at a pot temperature of 112° C. The reaction was completed by refluxing with gradual takeoff of solvent over the course of six hours to a final pot temperature of 145° C. Residual solvent was then removed by distillation under 30–40 mm. (water pump) vacuum up to a maximum pot temperature of 150° C. The product was a glassy semi-solid at room temperature.

That reaction had occurred to form the mixed neutral ester was indicated by the following analysis:

|  | Calculated[1] | Observed |
|---|---|---|
| Acid number | 0 | 50 |
| Hydroxyl Number | 0 | 17 |
| Chlorine, percent | 23.2 | 22.6 |
| Phosphorus, percent | 2.53 | 2.74 |

[1] Calculated for the following structure:

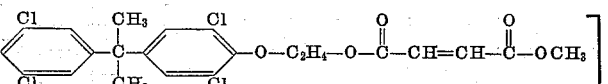

The above symmetrical mixed neutral ester from 2 mols of 2,2'-[isopropylidenebis(2,6-dichloro-p-phenyleneoxy)]diethanol esterified with 2 mols of methyl hydrogen fumarate and then with 1 mol of ethyl phosphorodichloridate, as above, was copolymerized with styrene and with mixtures of styrene and diallyl benzene phosphonate. The products were clear, hard, yellow plastics with useful properties. Evaluation data are listed in Table I. It will be noted that physical properties are as good as those obtained from commercial general-purpose unsaturated polyester-styrene mixtures, while the additional advantage of high flame resistance is shown. Castings were self-extinguishing if styrene content did not exceed 40%.

The new monomer of this invention forms styrene copolymers with excellent resistance to discoloration from light exposure. This was shown by ultraviolet light aging of castings in comparison with two commercial flame resistant copolymerizable mixtures with the same percent of styrene. One of the commercial copolymers was based on a tetrachlorophthalic polyester, while the other commercial copolymer was based on hexachloro-endomethylene-tetrahydrophthalic polyester. Copolymers from the new monomer of this example showed less discoloration, even without light stabilizer, than the commercial materials showed in the presence of light stabilizer.

Table I

PROPERTIES OF COPOLYMERS

| Composition: | | | | |
|---|---|---|---|---|
| Mixed neutral ester monomer, parts by weight | 60 | 50 | 60 | 50 |
| Styrene, parts by weight | 40 | 50 | 30 | 40 |
| Diallyl benzene phosphonate, parts by weight | | | 10 | 10 |
| 50% Benzene peroxide paste | 4 | 4 | 4 | 4 |
| Cure: 15 hours at 70° C. and 1 hour at 110° C. | | | | |
| Properties: | | | | |
| Rockwell R Hardness | 128 | 128 | | |
| Tensile Strength, p.s.i | 5,490 | 4,890 | | |
| Elongation [1] at Break, Percent | 12.5 | 10.4 | | |
| Young's Modulus (p.s.i.×10⁻³) at— | | | | |
| 25° C | 570 | 560 | 530 | 540 |
| 50° C | 490 | 490 | 330 | 340 |
| 75° C | 310 | 300 | 8.2 | 14 |
| 100° C | 10 | 3.2 | 1.7 | 1.0 |
| 125° C | 1.2 | 0.9 | | |
| Heat Distortion Temperature, °C | 93 | 93 | 70 | 71 |
| Izod Notched Impact Strength (ft. lb. per in. notch) | 0.26 | 0.25 | | |
| Burning Rate, in. per min. (by A.S.T.M. Test D635–44) | [2] s.e. | 0.48 | [2] s.e. | [2] s.e. |

[1] NOTE.—Elongations were determined from jaw separations and therefore are not true absolute values. For example, a jaw separation elongation of 10% corresponds to A.S.T.M. elongation of about 1.7%.
[2] Self-extinguishing.

In Example 1, the ethyl phosphorodichloridate (the name adopted in Chemical Abstracts Index in 1952) was previously called ethoxyphosphoryl dichloride.

The trans-beta-(methoxycarbonyl)acrylyl chloride can also be called the methyl half-ester half-chloride of fumaric acid.

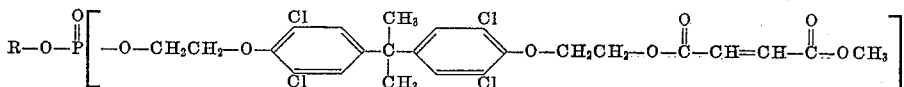

The 2,2'-[isopropylidenebis(2,6-dichloro-p-phenyleneoxy)]diethanol used in Example 1 is the subject of the Hurdis and Petras application Serial No. 622,548, filed concurrently herewith, and assigned also to the present assignee. It can be prepared as follows from 4,4'-isopropylidenebis(2,6-dichlorophenol) (British Patent No. 614,235).

A reaction flask of 2 liter capacity, equipped with mechanical stirrer, gas inlet tube and reflux condenser was charged with:

| | | |
|---|---|---|
| Isopropylidenebis(2,6-dichlorophenol), 2 mols | g | 732 |
| Propylene glycol, used as solvent | ml | 150 |
| Benzyltrimethylammonium chloride, 60% aqueous solution | ml | 32 |
| 50% sodiumhydroxide solution | g | 16 |

The charge was melted and kept at 105–115° C. while ethylene oxide was bubbled in. When the mixture had gained 170 grams in weight (theory 175 g.), the reaction was discontinued. The reaction mixture was then dissolved in 8 liters of hot methanol, and 4 liters of water were added to precipitate the product in crystalline form. By filtering and drying, 1398 g. of material melting at 112° C.–114° C. was obtained. By adding an additional 2 liters of water to the mother liquor a second fraction weighting 191 g. of M.P. 109° C.–112° C. was isolated. Total yield was 87.5%. The following analysis confirmed that the product was 2,2'-[isopropylidenebis(2,6-dichloro-p-phenyleneoxy)]diethanol.

Analysis:

| | Calculated | Observed |
|---|---|---|
| Molecular weight | 454 | 452 |
| Hydroxyl number | 247 | 247 |
| Chlorine, percent | 31.3 | 30.9 |

Having thus described our invention, what we claim and desire to protect by Letters Patent is:

1. A compound represented by the general formula

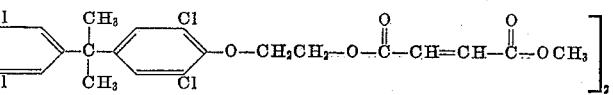

where R is an alkyl group containing from 1 to 4 carbon atoms.

2. A compound represented by the formula

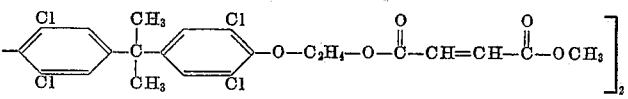

References Cited in the file of this patent

UNITED STATES PATENTS

| 2,331,265 | Coleman et al. | Oct. 5, 1943 |
| 2,557,091 | Gamrath et al. | June 19, 1951 |
| 2,631,168 | Ross et al. | Mar. 10, 1953 |